United States Patent [19]

Maeda

[11] Patent Number: 4,862,446

[45] Date of Patent: Aug. 29, 1989

[54] OPTICAL FOCUS ERROR CONTROL PICKUP DEVICE FOR AN OPTICAL RECORDING/REPRODUCING SYSTEM

[75] Inventor: Takanori Maeda, Saitama, Japan

[73] Assignee: Pioneer Electronic Corporation, Tokyo, Japan

[21] Appl. No.: 97,769

[22] Filed: Sep. 17, 1987

[30] Foreign Application Priority Data

Sep. 17, 1986 [JP] Japan .................... 61-218615

[51] Int. Cl.$^4$ ............................................. G11B 7/35
[52] U.S. Cl. ................................ 369/112; 369/45; 369/46; 369/124
[58] Field of Search ............ 369/44, 45, 46, 120, 369/121, 122, 110, 111, 112, 124; 250/201 DF

[56] References Cited

U.S. PATENT DOCUMENTS

| | | | |
|---|---|---|---|
| 4,296,316 | 10/1981 | Tsuji et al. | 369/46 |
| 4,625,303 | 11/1986 | Shikama et al. | 369/46 |
| 4,658,391 | 4/1987 | Nozu et al. | 369/45 |
| 4,663,750 | 5/1987 | Hamanaka et al. | 369/45 |
| 4,707,648 | 11/1987 | Minami | 369/45 |
| 4,769,801 | 9/1988 | Funada et al. | 369/45 |

Primary Examiner—Robert L. Richardson
Assistant Examiner—James Tomassini
Attorney, Agent, or Firm—Sughrue, Mion, Zinn, Macpeak & Seas

[57] ABSTRACT

In an optical pickup device comprising an optical detector which is divided into first, second and third regions for detection of a light beam reflected from a disk, the detector is arranged in such a manner that the first region is located between the second and third regions and has a width determined so that the effects of diffracted light of the tracks on the disk are cancelled. Optical means give astigmatism and other aberrations to the light beam applied to the optical detector. A differential amplifier receives a first signal outputed by the first region and a second signal which is the sum of the output signals of the second and third regions, to form a focus error signal. Gain control means control the gain of at least one of the first and second signals to eliminate the resultant offset between the first and second signals. Thus, focus servo can be carried out with high accuracy at all times.

6 Claims, 2 Drawing Sheets

FIG. 5
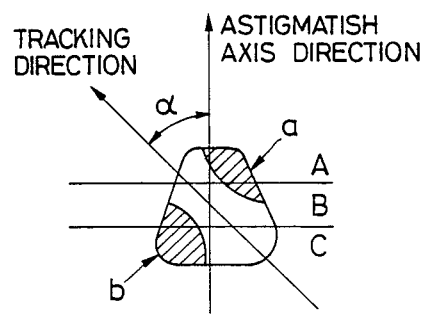
FIG. 6(a)     FIG. 6(b)     FIG. 6(c)
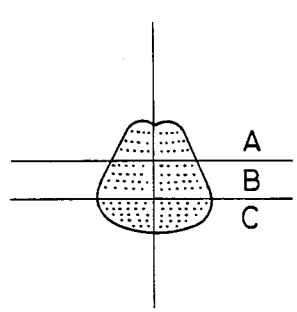 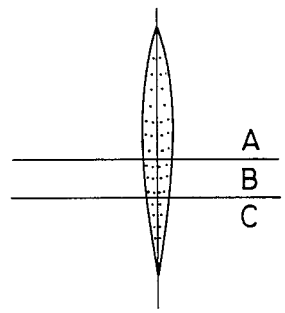 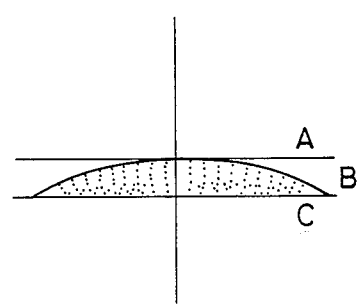
FIG. 7
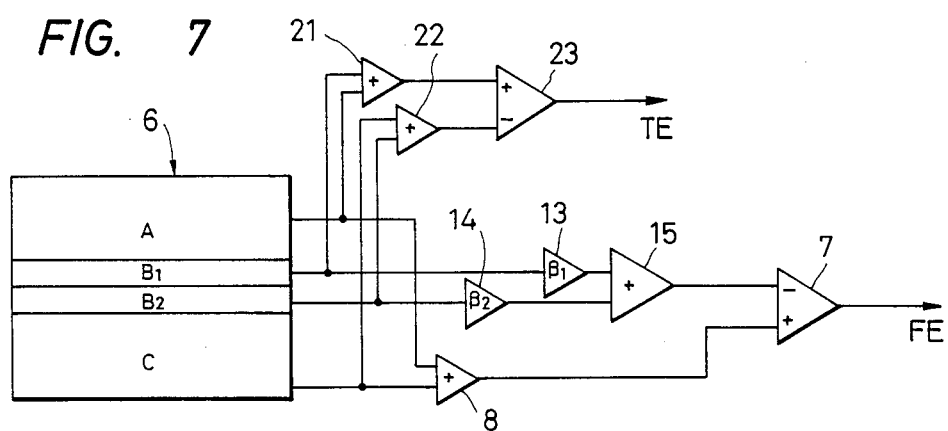

OPTICAL FOCUS ERROR CONTROL PICKUP DEVICE FOR AN OPTICAL RECORDING/REPRODUCING SYSTEM

BACKGROUND OF THE INVENTION

1. Field of the Invention

This invention relates to an optical pickup device for recording and reproducing data in a video disk player, compact disk player or the like.

2. Background of the Invention

An optical pickup device is known in which focus control is carried out using astigmatism and in which an optical detector is used which is divided into three parts by two substantially parallel lines. Such disclosure appears, for instance, in Japanese Patent Application (OPI) Nos. 87328/1980 and 45947/1985.

FIG. 1 shows the principle of the conventional optical pickup device. In FIG. 1, a laser beam emitted from a light source 1, such as a semiconductor laser is applied to a beam splitter (half-prism) 2. The light beam reflected from the beam splitter 2 is focused on a rotating disk 4 with an objective lens 3. The light beam reflected from the disk 4 is applied through the objective lens 3 and the splitter 2 to a cylindrical lens 5, where it is given astigmatism. The light beam thus treated is detected by an optical detector 6.

As shown in FIG. 2, the optical detector 6 is divided by two substantially parallel lines into three regions A, B and C in such a manner that region B is located between regions A and C. As was described above, the light beam has been given astigmatism. Therefore, when the light beam is focused on the disk 4, a substantially circular light spot is formed on the optical detector 6. As the disk 4 is moved away from the focused position, a substantially elliptical light spot which is horizontally or vertically elongated is formed. The sum of the outputs of regions A and C is calculated by an addition circuit 8. The difference between the sum of the A and C outputs and the output of region B is obtained by a differential amplifier 7. The width of region B is selected so that the output of the differential amplifier 7 is zero when the disk 4 is at the focused position. Accordingly, as the disk 4 is moved away from the focalization position, the differential amplifier 7 provides an output corresponding to the movement. Therefore, the output can be employed as a focus error signal which controls the position of the objective lens 3. (That is, focus control is accomplished.)

When the focus error signal does not become zero although the disk is at the focused position, offset adjustment is carried out by moving the optical detector 6 along the optical axis when the two division lines are in parallel or by moving it in a plane perpendicular to the optical axis when the two division lines are not in parallel. The tracking direction is substantially in parallel with the two division lines. Therefore, the focus error signal is free from the movement of the light spot which is carried out for tracking control.

In the case where a cylindrical lens is employed as optical means for providing astigmatism, other aberrations will scarcely occur. On the other hand, in the case where a parallel planar plate is employed, not only astigmatism but also other aberrations take place so that the light spot is not circular when the focalization is obtained. As a result, when the light beam goes across the tracks on the disk, the components of diffracted light of the tracks, i.e., so-called "push-pull signals" are not canceled out between the regions. Thus, the resultant focus error signal is erroneous and focus servo control cannot accurately be achieved.

SUMMARY OF THE INVENTION

Accordingly, an object of this invention is to eliminate the above-described difficulties accompanying a conventional optical pickup device.

The foregoing object and other objects of the invention have been achieved by the provision of an optical pickup device which, according to the invention, comprises a light source, an objective lens for focusing a light beam emitted from the light source, and an optical detector. The optical detector is substantially divided into first, second and third regions for detecting a light beam reflected from the disk in such a manner that the first region is located between the second and third regions and has a width which is determined so that the effects of diffracted light of tracks on the disk is cancelled. Optical means give astigmatism and possibly other aberrations to the light beam applied to the optical detector. A differential amplifier receives a first signal outputed by the first region and a second signal obtained by adding the output signals of the second and third regions, to form a focus error signal. According to the invention, gain control means control the gain of at least one of the first and second signals so that the resultant offset between the first and second signals is eliminated.

The nature, principle and utility of the invention will become more apparent from the following detailed description when read in conjunction with the accompanying drawings.

BRIEF DESCRIPTION OF THE DRAWINGS

In the accompanying drawings:

FIGS. 5 and 6(a) through 6(c) are explanatory diagrams for describing a light spot formed in the device;

FIG. 7 is a block diagram showing one modification of the optical pickup device according to the invention;

DETAILED DESCRIPTION OF THE INVENTION

Figure 1:
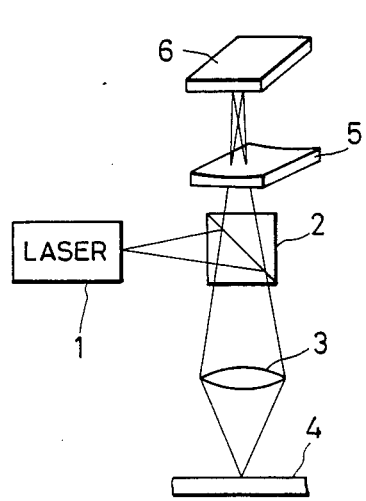
FIG. 1 is an explanatory diagram for a description of the principle of a conventional optical pickup device.
Figure 3:
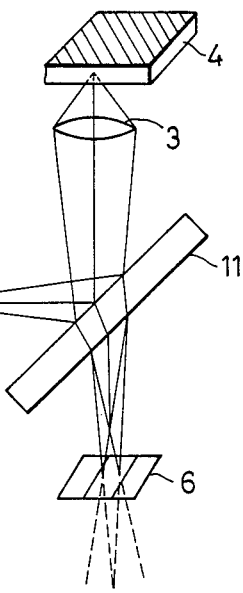
FIG. 3 is an explanatory diagram for a description of the principle of the device.
Figure 2:
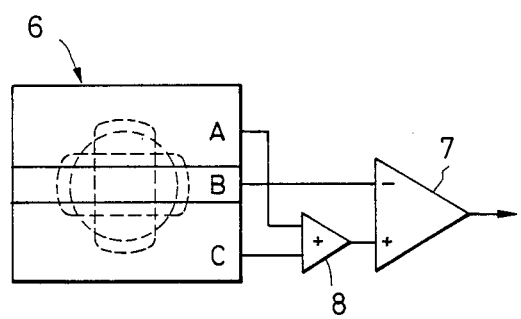
FIG. 2 is a block diagram showing the conventional optical pickup device.

In order to provide a full understanding of this invention, first the principle of an optical pickup device according to the invention will be described with reference to FIG. 3, in which parts corresponding functionally to those already described with reference to FIG. 1 are designated by the same reference numerals.

In the device, a light beam emitted from a light source 1 is reflected by a surface of a parallel planar plate 11 (which is a half mirror) inclined with respect to the optical axis and is then applied through an objective lens 3 to a rotating disk 4. The light beam is reflected by the disk 4 and applied again through the objective lens 3 to the parallel planar plate 11 where it is made astigmatic as it passes therethrough. The light beam thus treated is detected by a three-segment optical detector 6.

Figure 4:
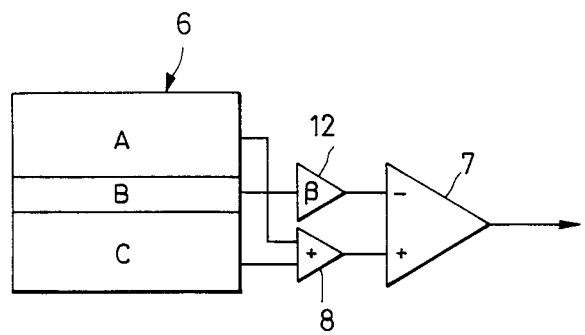
FIG. 4 is a block diagram showing one example of an optical pickup device according to this invention.

The optical detector 6, as shown in FIG. 4, is divided into three regions A, B and C. The output of regions A and C are added by an addition circuit 8, and the output of region B is controlled to a predetermined gain β by a variable gain control circuit 12. The difference between the output of the addition circuit 8 and the output of the gain control circuit 12 is calculated by a differential amplifier 7, which outputs a focus error signal.

The use of the parallel planar plate 11 as optical means for giving astigmatism can eliminate the beam splitter 2 of FIG. 1, thus simplifying the arrangement of the device. Furthermore, a parallel planar plate can be manufactured more readily than a cylindrical lens of the conventional optical pickup device. On the other hand, the parallel planar plate 11 gives not only astigmatism but also coma to a light beam passing through it. Therefore, the configuration of the light spot formed on the optical detector 6 when the disk is at the focus position or near it is distorted from a circle or ellipse as shown in FIGS. 6(a), 6(b), and 6(c). Accordingly, the diffracted light of the track asymmetrically affects the light spot. Therefore, if, as in the conventional device, the width of region B were determined so that the sum of the outputs of regions A and C is equal to the output of region B, then the component of the diffracted light in the focus error signal would not be cancelled out.

In the invention, the width of region B is so selected so that the effect of the diffracted light of the track is cancelled. For instance, in the case where, as shown in FIG. 5, a tracking direction forms an angle α with respect to the direction of the astigmatism axis (i.e., the direction perpendicular to the division lines), a shadow a caused by diffraction of the left-handed tracks and a shadow caused b by diffraction of the right-handed tracks appear in a direction (right-to-left direction) perpendicular to the tracking direction. If it is assumed that the light spot formed is trapezoidal, then these shadows appear along the oblique sides of the trapezoid when the angle is 0°, and along the upper and lower sides when it is 90°, respectively. The distribution of energy of the trapezoidal light spot and the shadows of the diffracted light can be calculated by simulation of the pickup components and the track, thus making it possible to determine the width of region B so that the components of the diffracted light are cancelled out. This means that, where the distribution of energy is uniform, the width of region B is determined so that the sum of the part of a in region A and the part of b in region C is equal to the sum of the parts of a and b in region B, in FIG. 5.

Even when the width of region B is determined as described above, the output of the addition circuit 8, which is the sum of the outputs of regions A and C, is not always equal to the output of region B. That is, sometimes the former is different from the latter. Therefore, the gain control circuit 12 is adjusted to cancel the difference or offset. Instead, the gain of the output of the addition circuit 8 may be controlled.

As was described above, the effect of the diffracted light of the track is canceled out by setting the width of region B to a predetermined value and the resultant offset is eliminated by the gain control circuit 12. Therefore, the focus servo can be achieved accurately with the focus error signal outputted by the differential amplifier 7.

The optical pickup device of the invention may be modified as follows. As shown in FIG. 7, in the case where the tracking direction forms a non-zero angle α with respect to the direction of astigmatism axis, the region B is further divided into sub-regions $B_1$ and $B_2$. The outputs of region A and sub-region $B_1$ are added by an addition circuit 21 while the outputs of region C and sub-region $B_2$ are added by another addition circuit 22. The difference between the outputs of the addition circuits 21 and 22 is calculated by a differential amplifier 23 to provide a tracking error signal. The outputs of the sub-regions $B_1$ and $B_2$, after being gain-controlled by variable gain control circuits 13 and 14, are applied to an addition circuit 15, the output of which is supplied to a differential amplifier 7. It goes without saying that, in this case, instead of the outputs of sub-regions $B_1$ and $B_2$, the output of the addition circuit 15 may be gain-controlled.

If, in the above-described case (where the tracking direction inclines by an angle α) the tracking direction is made parallel with the division lines similarly as in the case where α=0, then the focus error signal will not be at all adversely affected even when the spot light is moved in association with the tracking control.

While the invention has been described with reference to the case where the parallel planar plate is employed to give astigmatism, it should be noted that the invention is not limited thereto or thereby. That is, the technical concept of the invention is applicable to the case where a wedge-shaped planar plate is used.

As is apparent from the above description, the optical pickup device of the invention comprises the light source, the objective lens for focusing a light beam from the light source on the disk and the optical detector which is substantially divided into the first, second and third regions for detecting a light beam reflected from the disk in such a manner that the first region is located between the second and third regions. The optical means induce astigmatism and other aberrations to the light beam applied to the optical detector. The differential amplifier receives the first signal outputed by the first region and the second signal obtained by adding the output signals of the second and third regions to form the focus error signal. The gain control means controls the gain of at least one of the first and second signals. The first region has a width which is determined to cancel the effects of diffracted light of the tracks on the disk are cancelled. The gain control means controls the gain to eliminate the resultant offset between the first and second signals. Therefore, the optical pickup device of the invention is simple in construction, and low in manufacturing cost, and it can achieve focus servo with high accuracy.

What is claimed is:
1. An optical pickup device comprising:
a light source;
an objective lens for focusing a light beam from said light source on a disk;
an optical detector which is substantially divided into first, second and third regions for detecting a light beam reflected from said disk in such a manner that said first region is located between said second and third regions;
optical means for giving astigmatism and other aberrations to said light beam applied to said optical detector;
a differential amplifier for receiving a first signal outputed by said first region and a second signal obtained by adding output signals of said second and third regions, to form a focus error signal; and
gain preset control means for controlling a gain of at least one of said first and second signals.

2. An optical pickup device as recited in claim 1, wherein:
said first region has a width determined so that effects of diffracted light of tracks on said disk are cancelled; and
said gain control means controls said gain to eliminate an offset between said first and second signals resulting from the determining of said width.

3. An optical pickup as recited in claim 1, wherein said preset gain control means is a preset variable gain amplifier receiving said first signal.

4. An optical pickup device as recited in claim 1, wherein said first region is divided into a first and a second sub-region and said first signal is obtained by adding output signals of said first and second sub-regions.

5. An optical pickup device as recited in claim 4, further comprising:
means for adding the outputs of the second region and the first sub-region to form a third signal;
means for adding the outputs of the third region and the second sub-region to form a fourth signal; and
a differential amplifier for receiving said third and fourth signals to form a tracking error signal.

6. An optical pickup device as recited in claim 1, wherein said optical means for giving astigmatism and other aberrations is a parallel planar plate.

* * * * *